US008442097B2

(12) United States Patent
Fenton et al.

(10) Patent No.: US 8,442,097 B2
(45) Date of Patent: *May 14, 2013

(54) APPARATUS FOR AND METHOD OF MAKING PULSE-SHAPE MEASUREMENTS (75) Inventors: Patrick C. Fenton, Calgary (CA); Ian Williamson, Calgary (CA); David Brown, Calgary (CA)

(73) Assignee: NovAtel Inc., Calgary (CA)

(*) Notice: Subject to any disclaimer, the term of this patent is extended or adjusted under 35 U.S.C. 154(b) by 106 days.

This patent is subject to a terminal disclaimer.

(21) Appl. No.: 12/769,260

(22) Filed: Apr. 28, 2010

(65) Prior Publication Data
US 2010/0246645 A1    Sep. 30, 2010

Related U.S. Application Data (63) Continuation of application No. 12/407,490, filed on Mar. 19, 2009, which is a continuation of application No. 10/823,030, filed on Apr. 13, 2004, now Pat. No. 7,738,536.

(60) Provisional application No. 60/462,973, filed on Apr. 15, 2003.

(51) Int. Cl.
*H04B 1/00*    (2006.01)

(52) U.S. Cl.
USPC .......................................................... 375/150

(58) Field of Classification Search .................. 342/352, 342/357.37, 357.61; 375/130, 149, 150, 343, 375/347, 354
See application file for complete search history.

(56) References Cited

U.S. PATENT DOCUMENTS

| 4,894,842 A |   | 1/1990 | Broekhoven et al. |
|---|---|---|---|
| 5,134,407 A | * | 7/1992 | Lorenz et al. ................. 342/352 |

(Continued)

FOREIGN PATENT DOCUMENTS

| EP | 0892277 A2 | 1/1999 |
|---|---|---|
| EP | 1 614 230 | 1/2006 |

(Continued)

OTHER PUBLICATIONS

Lawrence R. Weill, Multipath Mitigation Using Modernized GPS Signals: How Good Can it Get?, Dept.of Mathematics, California State University, Fullerton, pp. 493-505, ION GPS 2002, Sep. 24-27, 2002, Portland, OR.

*Primary Examiner* — Leon-Viet Nguyen
(74) *Attorney, Agent, or Firm* — Cesari and McKenna, LLP; Patricia A. Sheehan (57) ABSTRACT A receiver includes a pre-correlation filter that forms an image of the average chip shape of a received signal over a specified period of time. The filter includes an array of complex accumulation registers that accumulate measurements that are associated with signal samples from specific ranges of locations, or code chip phase angles, along a spread-spectrum chip. Using the accumulated measurements, the receiver estimates the location of the chip transitions in a direct path signal component. The receiver may thereafter change the starting points, sizes and numbers of ranges, such that the accumulation registers accumulate more detail from the chip edges. The receiver in addition may use the accumulated measurements from selected registers and/or selected groups of registers, to produce the correlation values that are needed to perform one or more correlation techniques and/or one or more multipath mitigation techniques. As appropriate, the sizes and/or starting points of the bins, and/or the selections of the bins for the various groupings may be altered, to change the spacings, locations, and so forth to which correlation values correspond.

18 Claims, 6 Drawing Sheets

U.S. PATENT DOCUMENTS

| | | | |
|---|---|---|---|
| 5,390,207 A * | 2/1995 | Fenton et al. | 375/149 |
| 5,402,450 A * | 3/1995 | Lennen | 375/343 |
| 5,414,729 A | 5/1995 | Fenton | |
| 5,630,208 A | 5/1997 | Enge et al. | |
| 5,654,980 A | 8/1997 | Latva-aho et al. | |
| 5,764,686 A | 6/1998 | Sanderford et al. | |
| 5,963,582 A | 10/1999 | Stansell, Jr. | |
| 5,974,038 A | 10/1999 | Shou et al. | |
| 5,990,827 A | 11/1999 | Fan et al. | |
| 6,031,881 A | 2/2000 | Weill et al. | |
| 6,195,328 B1 | 2/2001 | Tsui et al. | |
| 6,236,687 B1 | 5/2001 | Caso et al. | |
| 6,243,409 B1 | 6/2001 | Fenton et al. | |
| 6,259,401 B1 | 7/2001 | Woo | |
| 6,370,207 B1 | 4/2002 | Weill et al. | |
| 6,466,612 B2 | 10/2002 | Kohli et al. | |
| 6,493,376 B1 * | 12/2002 | Harms et al. | 375/130 |
| 6,493,378 B1 | 12/2002 | Zhodzishsky et al. | |
| 6,532,251 B1 | 3/2003 | King et al. | |
| 6,636,558 B1 | 10/2003 | Schnaufer et al. | |
| 6,658,048 B1 | 12/2003 | Valio | |
| 6,751,247 B1 | 6/2004 | Zhengdi | |
| 6,788,731 B2 | 9/2004 | Kim et al. | |
| 6,798,758 B1 | 9/2004 | Chun et al. | |
| 6,868,110 B2 | 3/2005 | Phelts et al. | |
| 6,912,242 B2 | 6/2005 | Farine et al. | |
| 6,967,992 B1 | 11/2005 | Rabaeijs et al. | |
| 7,042,930 B2 | 5/2006 | Dafesh | |
| 7,224,721 B2 | 5/2007 | Betz et al. | |
| 7,280,582 B2 | 10/2007 | Medlock | |
| 7,295,633 B2 | 11/2007 | Kohli et al. | |
| 7,298,324 B2 | 11/2007 | Manz | |
| 7,738,606 B2 * | 6/2010 | Williamson et al. | 375/347 |
| 2002/0181632 A1 | 12/2002 | Kang et al. | |
| 2003/0095592 A1 | 5/2003 | Bergmans et al. | |
| 2003/0147457 A1 * | 8/2003 | King et al. | 375/148 |
| 2003/0202569 A1 | 10/2003 | Kim et al. | |
| 2004/0071200 A1 | 4/2004 | Betz | |
| 2004/0161071 A1 * | 8/2004 | Chen et al. | 375/376 |
| 2004/0208236 A1 | 10/2004 | Fenton | |
| 2005/0025222 A1 | 2/2005 | Underbrink et al. | |
| 2006/0095206 A1 | 5/2006 | Garin et al. | |
| 2010/0328152 A1 | 12/2010 | Abraham et al. | |

FOREIGN PATENT DOCUMENTS

| | | |
|---|---|---|
| JP | H8-8780 | 6/1994 |
| JP | H8-32547 | 2/1996 |
| WO | WO 97/06446 | 2/1997 |

* cited by examiner

APPARATUS FOR AND METHOD OF MAKING PULSE-SHAPE MEASUREMENTS

CROSS-REFERENCE TO RELATED APPLICATIONS

The present application is a continuation of commonly assigned copending U.S. patent application Ser. No. 12,407,490, which was filed on Mar. 19, 2009, by Patrick C. Fenton for a APPARATUS FOR AND METHOD OF MAKING PULSE-SHAPE MEASUREMENTS and is hereby incorporated by reference, which is a continuation of commonly assigned Ser. No. 10/823,030, filed Apr. 13, 2004, now U.S. Pat. No. 7,738,536, which issued on Jun. 15, 2010, to Patrick C. Fenton for a APPARATUS FOR AND METHOD OF MAKING PULSE-SHAPE MEASUREMENTS which claims priority from U.S. Provisional Patent Application Ser. No. 60/462,973, filed on Apr. 15, 2003, by Patrick C. Fenton for a PULSE-SHAPE MEASUREMENT FOR MULTI-PATH-MITIGATION TECHNOLOGY and is hereby incorporated by reference.

BACKGROUND OF THE INVENTION

1. Field of the Invention

The invention relates generally to systems for measuring the pulse shape of a broadcast spread-spectrum signal and, in particular, to systems that provide multipath mitigation by estimating at least the direct path signal based on the pulse shape measurements.

2. Background Information

One example of a system that utilizes broadcast spread-spectrum signals is a global positioning system, such as, GPS, GLONAS or AltBOC systems. The system receivers determine their global positions based on the signals they receive from associated satellites. The broadcast spread-spectrum signal consists of a carrier that is modulated by at least one pseudorandom code, such as a binary PRN code that consists of a seemingly random sequence of one and zeros that periodically repeat. The ones and zeros in the PRN code are referred to as "code chips," and the transitions in the code from one to zero or zero to one, which occur at "code chip times," are referred to as "bit transitions." Each satellite uses a unique PRN code, and thus, a receiver can associate a received signal with a particular satellite by determining which PRN code is included in the signal.

The receiver calculates the difference between the time a satellite transmits its signal and the time that the receiver receives the signal. The receiver then calculates its distance, or "pseudorange," from the satellite based on the associated time difference. Using the pseudoranges from at least four satellites, the receiver determines its global position.

To determine the time difference, the receiver synchronizes locally-generated PRN codes with the PRN codes in the received signal by aligning the code chips in each of local codes with the chips in the corresponding satellite generated unique PRN codes. It then determines how much the locally-generated PRN codes are shifted, in time, from the known timing of the satellite PRN codes at the time of transmission, and calculates the associated pseudoranges by multiplying the measured time shifts by the speed of light. The more closely the receiver aligns the locally-generated PRN code with the PRN code in the received signal, the more precisely the receiver can determine the associated time difference and pseudorange and, in turn, its global position.

The code synchronization operations include acquisition of the satellite PRN code and tracking the code. To acquire the PRN code, the receiver generally makes a series of correlation measurements that are separated in time by a code chip, to determine when the locally-generated code aligns with the received code to within one code chip. To thereafter track the PRN code, the receiver generally makes correlation measurements that are associated with the received PRN code and early and late versions of the locally-generated PRN code. The receiver thus produces an associated error signal that is proportional to the misalignment between the local PRN code and the received PRN code. The error signal is used, in turn, to control the PRN code generator, which shifts the local PRN code essentially to minimize the error signal.

The receiver also typically aligns the satellite carrier with a local carrier using correlation measurements associated with a punctual version of the local PRN code. To do this the receiver uses a carrier tracking phase lock loop.

The receiver receives not only line-of-sight, or direct path, satellite signals but also multipath signals, which are signals that travel along different paths and are reflected to the receiver from the ground, bodies of water, nearby buildings, etc. The multipath signals arrive at the receiver after the direct-path signal and combine with the direct-path signal to produce a distorted received signal. This distortion of the received signal adversely affects code synchronization operations because the correlation measurements, which measure the correlation between the local PRN code and the received signal, are based on the entire received signal—including the multipath components thereof. The distortion may be such that the receiver attempts to synchronize to a multipath signal instead of to the direct-path signal. This is particularly true for multipath signals that have code bit transitions that occur close to the times at which code bit transitions occur in the direct-path signal.

One way to more accurately synchronize the received and the locally-generated PRN codes is to use the "narrow correlators" discussed in U.S. Pat. Nos. 5,101,416; 5,390,207 and 5,495,499. It has been determined that narrowing the delay spacing between early and late correlation measurements substantially reduces the adverse effects of noise and multipath signal distortion on the early-minus-late measurements. The delay spacing is narrowed such that the noise correlates in the early and late correlation measurements. Also, the narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak.

Another way to more accurately synchronize the received and the locally-generated PRN codes is to use a multipath mitigation processing technique that iteratively produces estimates of the direct path signal and one or more of the multipath signals. One such technique is described in U.S. Pat. Nos. 5,615,232 and 6,692,008. Another technique that uses multiple correlators is described in U.S. Pat. No. 5,414,729. Yet another multipath mitigation technique is discussed in Weill, "Multipath Mitigation Using Modernized GPS Signals: How Good Can It Get," *ION GPS* 2002, Portland, Oreg., Sep. 24-27, 2002.

The multipath mitigation processing techniques are based on the manipulation of pulse-shape information that corresponds to samples of the received signal taken at discrete code-phase offsets. The samples are taken in synchronism with a sample clock, with a predetermined number of samples taken per code chip.

Each signal in the pulse is represented by three parameters $[\tau, A, \theta]$, where $\tau$ represents the time offset or code delay, A represents the amplitude, and $\theta$ represents the phase angle. The basic form of the manipulations that extract the direct path signal, $[\tau_d, A_d, \theta_d]$, and two multipath signals, $[\tau_{mp1}, A_{mp1}, \theta_{mp1}]$ and $[\tau_{mp2}, A_{mp2}, \theta_{mp2}]$, is:

$$[\tau_d, A_d, \theta_d, \tau_{mp1}, A_{mp1}, \theta_{mp1}, \tau_{mp2}, A_{mp2}, \theta_{mp2}] = f \begin{bmatrix} I_1, Q_1 \\ I_2, Q_2 \\ I_3, Q_3 \\ \vdots \\ I_n, Q_n \end{bmatrix}$$

where the $I_i$, $Q_i$ values are the pulse-amplitude samples measured at discrete code-phase offsets along the fractional length of the expected pseudo-random-noise ("PRN") chip.

The input data from discrete sample points of the received spread-spectrum signal are samples from the composite signal, which includes the direct and the multipath signals. The accuracy of the multipath mitigation processing is inversely proportional to the thermal-noise level corrupting the samples of the incoming spread-spectrum signal. Individual samples of the signal are too noisy to achieve acceptable results, and a certain amount of filtering of the incoming signal is required to provide accurate multipath detection using the multipath mitigation techniques.

Multipath interference is usually slowly varying with respect to the frequency of the spread spectrum chip rate. Over a relatively long period of time, (a few seconds) the multipath interference affects every chip of the incoming signal the same way. The thermal noise, which dominates the signal, varies rapidly with each chip of the incoming signal and can be easily filtered.

SUMMARY OF THE INVENTION

The invention is a pre-correlation filter and a receiver that utilizes the filter to form an image of the average chip shape of the received signal over a specified period of time. The image is expressed as a time series of complex power measurements along the length of a single chip. The averaging process retains the detail of the composite signal (direct plus multipath signals) while reducing the level of signal noise by an amount proportional to the length of the averaging process.

The receiver includes in a receiver channel an array of complex-accumulation registers. Each complex register consists of an in-phase accumulation register and a quadrature accumulation register, and each of these accumulation registers can be separately and selectively enabled. The respective complex accumulation registers accumulate measurements that are associated with signal samples that are taken from specific ranges of locations, or code phase angles, along a spread-spectrum chip.

The length of the chip is divided into a plurality of "ranges," that is, into fractions of a chip. The ranges may but need not be the same size across the chip, and preferably the ranges are smaller near the rising edge of the chip. The ranges are associated with the respective complex accumulation registers. When a sample is taken, a corresponding measurement is added to the appropriate in-phase and quadrature accumulation registers that are associated with the range that includes the code phase angle estimated for the sample. As discussed in more detail below, the complex accumulation registers act as a pre-correlation filter, by collecting the measurements at sample times that are asynchronous with the code rate. In this way, the system avoids including associated correlation errors in the filtering process.

The system accumulates the measurements over many chips. The accumulation has essentially the same effect as a low-pass filter, and thus, wide-bandwidth noise is suppressed. The accumulated measurements, which provide the average chip shape of at least the direct path signals, are used by a multipath mitigation processing technique to compute the error of the code tracking loop due to multipath interference. The computed multipath error is then used to correct the code tracking loop, and thereby, provide more accurate pseudorange measurements. The multipath mitigation processing may also be used to compute the error of the carrier tracking loop due to multipath interference, with the computed error being used to correct the carrier tracking loop to provide even greater accuracy.

As also discussed below, the number, size and starting points of the ranges may be adjusted as the multipath mitigation processing estimates the locations of the chip transitions in the direct path signal. The ranges that include the chip edges, may be narrowed, and those that include the middle of the chip may be widened. Alternatively or in addition, the number of ranges may be reduced.

The pulse shape measurements may also be compared to a reference chip transition shape or shapes, to determine if the received signal includes interference that may cause range distortions. The receiver may then ignore the affected signals or correct for the interference, as appropriate.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
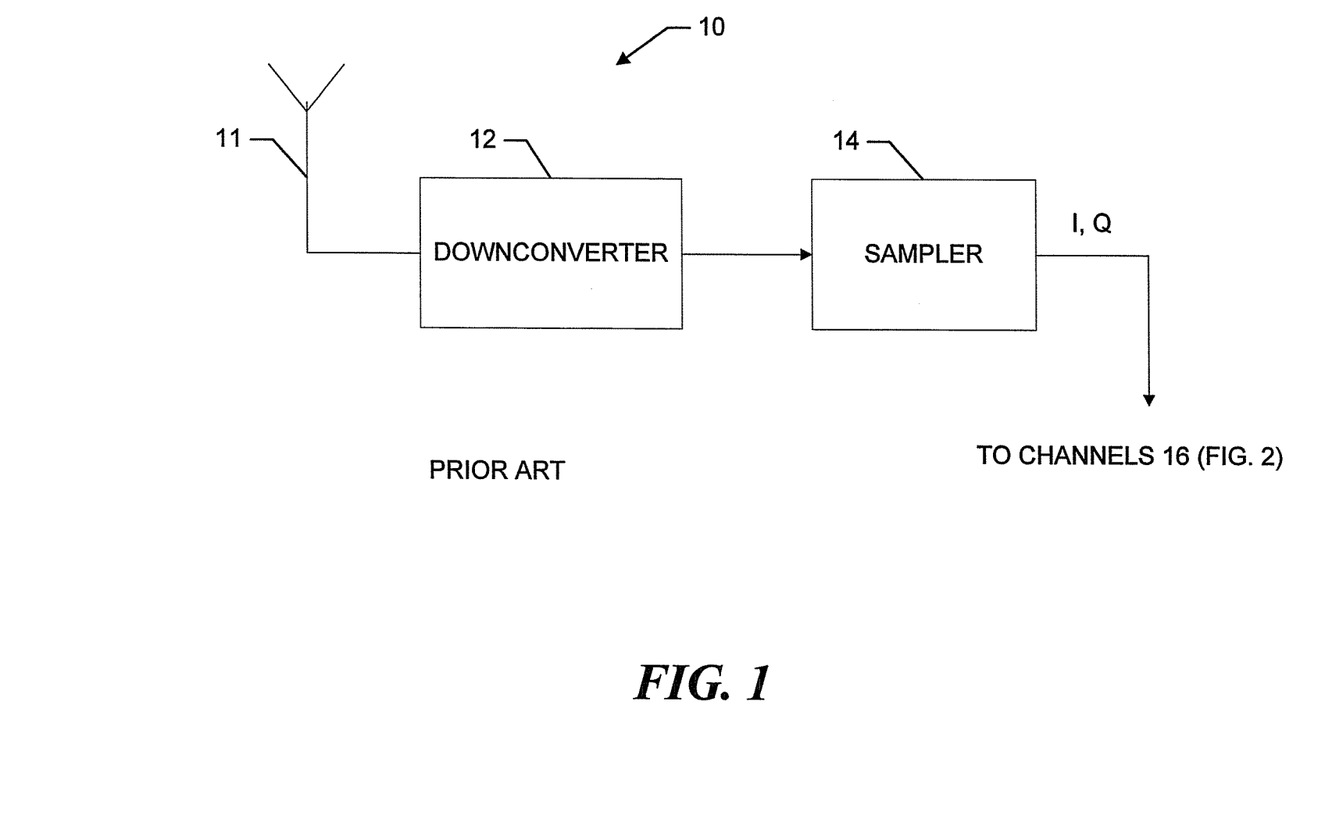
FIG. 1 is a block diagram of a spread-spectrum receiver that employs the present invention's teachings.

Referring to FIG. 1, a receiver 10 receives over an antenna 11 a composite signal that includes direct path signals and associated multipath signals. A downconverter 12 and sampler 14 operate in a conventional manner, to downconvert the received composite signal and in the exemplary embodiment take sequential samples of the downconverted signal. The sequential samples are provided to the respective channels 16 (FIG. 2).

Figure 2:
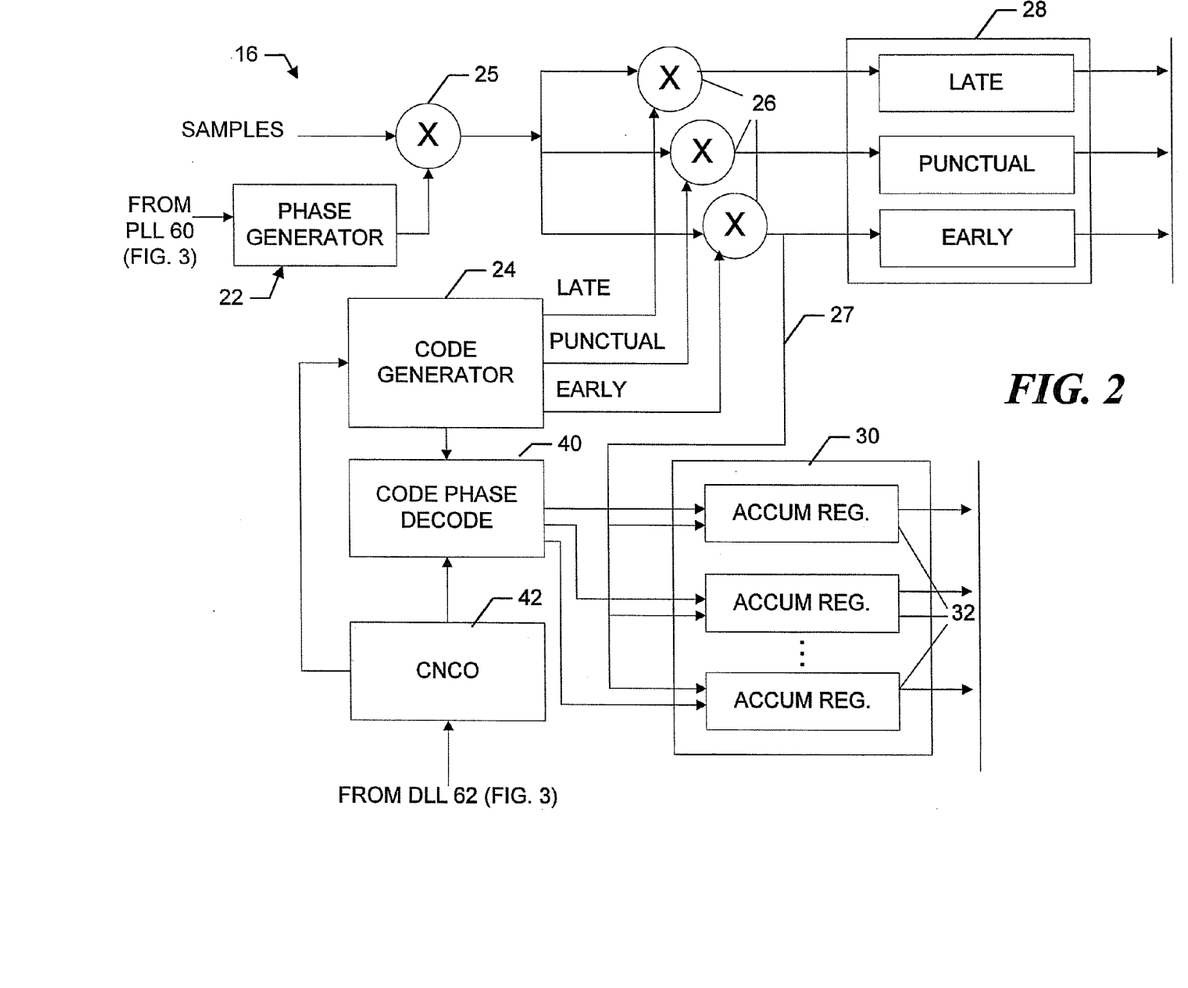
FIG. 2 is a more-detailed block diagram of a receiver channel.
Figure 3:
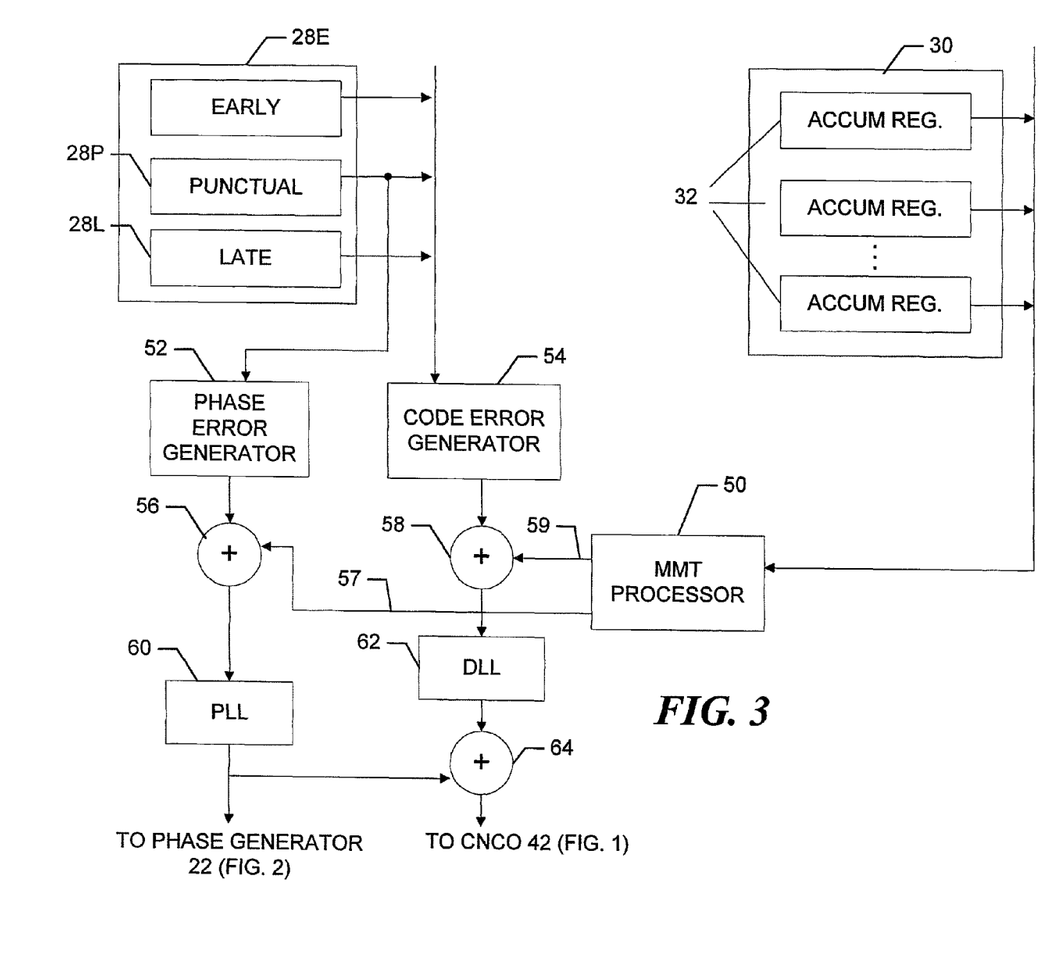
FIGS. 3 and 4 are more detailed block diagrams of components of the channel.

Referring now to FIG. 2, a given channel 16 includes a mixer 25 that removes the carrier from the samples by mixing them with an estimate of the carrier phase. Thus, in a know manner, the sequential samples are each mixed with both sine and cosine transformations of the estimated carrier phase to produce a corresponding complex I and Q sample pair. The carrier phase estimate is generated by a phase generator 22, which is controlled in a known manner by a carrier tracking error signal that is produced by a carrier phase lock loop ("PLL") 60 (FIG. 3). As discussed in more detail below with reference to FIG. 3, the PLL is controlled by a carrier phase error signal that is first manipulated to remove therefrom the adverse affects of multipath.

The channel 16 further includes a spread-spectrum code generator 24, which operates in a known manner to produce a locally-generated spread-spectrum code that corresponds to one of the codes in the received signal. In the example of a GPS system, the code generator 24 produces a locally-generated PRN code that is the same as the code that is transmitted by one of the satellites then in view. The code generator 24 further produces phase-delayed versions of the locally generated spread-spectrum code. The versions may be, for example, one-half chip Early, Punctual, and one-half chip Late versions. The I and Q samples are multiplied by the Early, Punctual and Late versions of the code in multipliers 26, to produce corresponding early, punctual and late measurement signals. The measurement signals are accumulated in Early, Punctual and Late complex accumulators 28. The operations of the complex accumulators are described in more detail below with reference to FIG. 5.

A code numerically controlled oscillator ("CNCO") 42 drives the code generator 24, to bring the local code into alignment with the received code. The CNCO is, in turn, driven by a code tracking error signal, which is based on a DLL error signal that is produced by a code tracking delay lock loop ("DLL") 62 (FIG. 3). As discussed in more detail below with reference to FIG. 3, the DLL is controlled by a code error signal that is first manipulated to remove therefrom the adverse affects of multipath. The CNCO 42 is discussed in more detail with reference to FIG. 4 below.

The early measurements on line 27 are also provided to an array 30 of complex accumulation registers 32. As discussed in more detail below, a code phase decoder 40 selectively enables the accumulation registers, such that a given early measurement is accumulated by the appropriate accumulation register 32. The accumulated measurements from the respective registers are provided at appropriate times to a multipath mitigation processor 50, which is referred to hereinafter as the "MMT" processor (FIG. 3). As discussed in more detail below, the multipath mitigation processor processes the measurements in accordance with a known multipath mitigation technique ("MMT"), to determine at least an estimate of the location of the chip edge of the direct path signal from the array of accumulated pulse shape measurements 32. The multipath mitigation processor 50 further produces carrier tracking and code tracking multipath error signals on lines 57 and 59, respectively. The signals are used by adders 56 and 58 to remove adverse affects of multipath from the carrier and code tracking operations.

Referring now also to FIG. 3, a phase error generator 52 converts the values accumulated by the Punctual accumulator 28P to a phase error signal in a conventional manner, using an arctan-like function. The adder 56 corrects the phase error signal by adding thereto the multipath phase correction signal produced by the MMT processor 50. The multipath-corrected phase error signal is then used by the PLL 60, to produce the phase tracking error signal that controls the phase generator 22.

A code error generator 54 uses the early, punctual and late values from the Early, Punctual and Late accumulators 28E, 28P, 28L in a conventional manner to estimate a code error using a formula that corresponds to the following:

$$CodeError = \frac{I_E^2 + Q_E^2 - I_L^2 - Q_L^2}{I_P^2 + Q_P^2}$$

An adder 58 corrects the code error signal produced by the code error generator 54 by adding thereto a multipath code phase correction signal produced by the MMT processor 50. The multipath-corrected code error signal is then used by the DLL 62, to produce the associated DLL error signal. An adder 64 combines the DLL error signal with the carrier tracking error signal produced by the PLL 60, to correct for changes in Doppler. The result is the code tracking error signal that is supplied to the CNCO 42.

Figure 4:
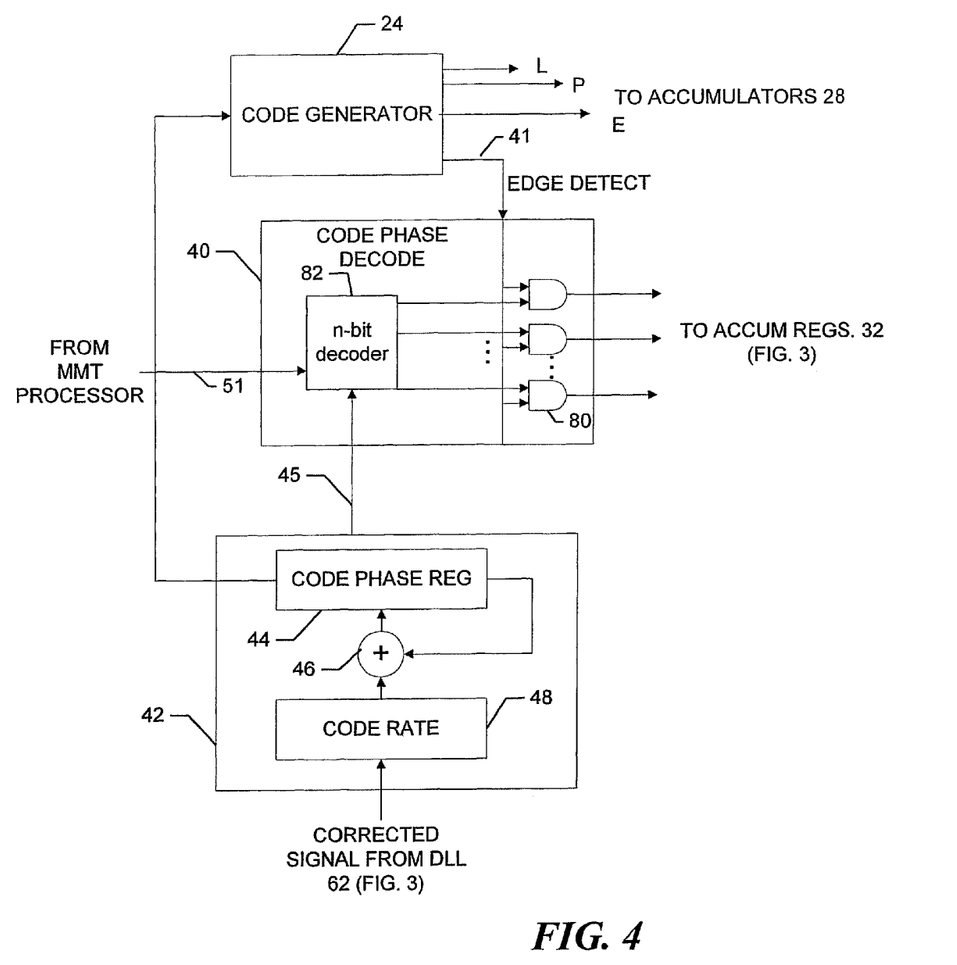

Referring now also to FIG. 4, the CNCO 42 produces chip-edge clock signals, which are used to align the phase of the locally-generated punctual PRN code produced by the code generator 24 to the phase of the received code. The CNCO also produces fine code chip phase detail signals that are used to represent the estimated code phases of respective I and Q samples. The CNCO includes a code rate register 48 that controls a code phase register 44. The code rate register produces a code rate error signal that is combined, in adder 46, with a code phase register feedback. The result drives the register to produce the code generator control signal at appropriate times. The correction provided by the code rate register is based on the code tracking error signal.

The code phase register at any given time contains a count that corresponds to estimated code phase, that is, to an estimated phase angle. When the count corresponds to the start of a new chip, the code phase register provides a signal to the code generator 24, which then produces the next chip of the locally generated code. The signal produced by the code phase register is synchronous with chip times in the early version of the local code. At every sample clock time the code phase register also provides the phase angle value to the code phase decoder 40, which controls the complex accumulation registers 32.

Figure 5:
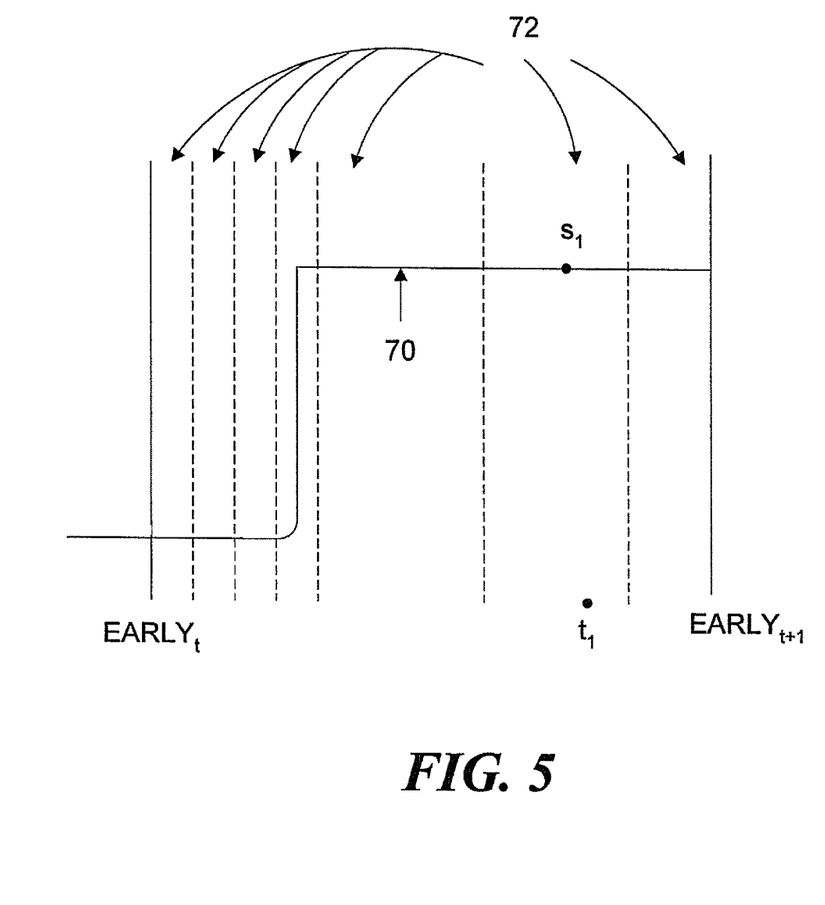
FIG. 5 is an illustration of code chip ranges.

Before discussing the operations of the code phase decoder 40 in more detail, we refer to FIG. 5 to describe the code chip ranges that are associated with the accumulation registers 32. As shown in the drawing, a code chip 70 is segmented into a plurality of code chip ranges 72, each of which is a fraction of a code chip. The sample $s_1$ taken at time $t_1$ has a phase angle that is included in a range that covers the middle of the chip. As illustrated, the ranges near the chip rising edge may be smaller than the ranges that are near the middle of the chip, to provide more measurement detail to the MMT processor 50.

Referring again to FIG. 4, at each pulse of the sample clock (not shown) the code phase register 44 provides to the code phase decoder 40 a phase value that corresponds to the estimated position, or phase angle, of the corresponding sample relative to the underlying code chip. Thus, at sample time $t_1$ (FIG. 5), the code phase register provides to the code phase decoder a phase angle value that corresponds to the sample's mid-chip position. An n-bit decoder 82 decodes the phase angle value into signals that drive a plurality of AND gates 80. The AND gates 80 produce signals that selectively disable all but the complex accumulation register 32 that corresponds to the mid-chip range that includes the estimated phase angle of the sample. The enabled complex accumulation register 32 then accumulates the early measurement value that corresponds to the sample.

Figure 6:
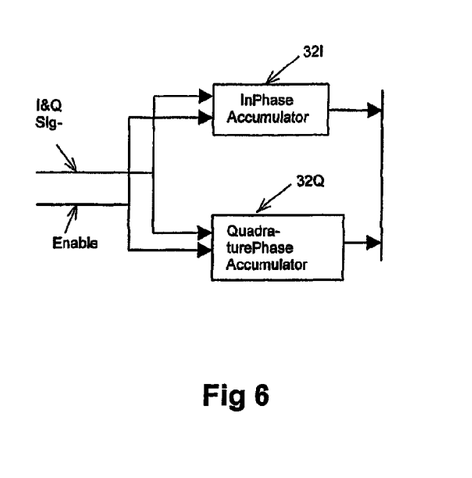
FIG. 6 is a block diagram of a complex accumulator.

As shown in FIG. 6, a complex accumulation register 32 includes Inphase and Quadrature phase registers 32I and 32Q. The I and Q samples are preferably processed separately by the receiver, since the samples may be associated with different ranges. The signals produced by the code phase decoder thus selectively enable only one of the complex register pairs, such that the measurement is collected by the appropriate complex accumulation register 32.

The code generator 24 also produces an edge detect signal on line 41, which is used by the AND gates 80 of the code phase decoder 40 to assert an enable signal for the array 30 of complex accumulation registers 32. Following a chip polarity change in the locally generated code, the edge-detect signal is enabled and remains enabled for the entire chip. The edge-detect signal is not enabled at the start of a chip when there is no change in the chip level, since the information that is most useful to the MMT processor 50 is produced during the chip-edge transitions. The corresponding measurement values may instead be accumulated in an accumulation register that is selectively enabled when the edge detect signal is not enabled. These measurements, which include very little phase modulation, are provided at appropriate times to the MMT processor 50.

The early measurements, that is, the results of multiplying the downconverted complex signal and the early version of the local code, are used for the complex-accumulation registers 32 in the embodiment described herein. However, any of the early, punctual or late measurements may instead be used, as long as the edge-detect signal is made synchronous with the selected measurements.

Figure 7:
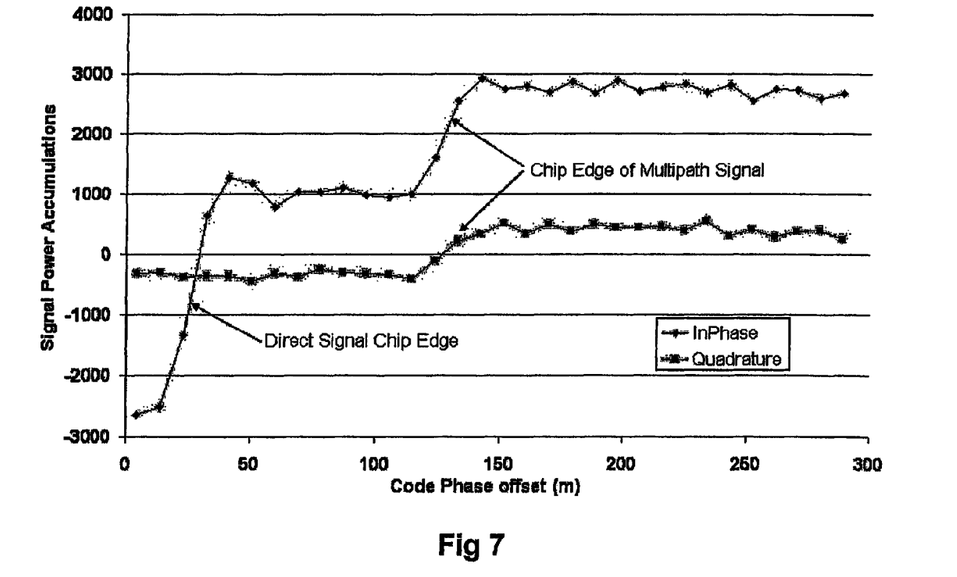
FIG. 7 is an example plot of the accumulated values taken by the complex accumulation registers.

In operation, a satellite signal is acquired by the channel 16 in the usual manner. After the receiver is tracking in a steady-state phase locked loop, the contents of the complex-accumulation registers 32 are provided to the MMT processor 50. The MMT processor 50 processes the signals and determines if there is multipath interference. An exemplary set of a set of measurements of signals containing multipath interference is shown in FIG. 7. It can be seen in this example that the effect of the multipath signal can be easily distinguished from the chip edges of the direct signal. The measurements, which are based on 32 equally-sized ranges, provide the MMT processor with a very accurate representation of the received signal transmission chip shape. Using these measurements, the MMT processor operates in accordance with known MMTs to produce the code and carrier multipath error signals that remove the adverse affects of multipath interference from the code and carrier tracking operations. With the accurate representation of the direct path chip edges, the MMT processor 50 produces more accurate multipath code and carrier error signals in terms of code and carrier offsets. This leads directly to more accurate tracking of the direct signal code and carrier, and ultimately to more accurate pseudoranges.

After testing, it was determined that the chip may be advantageously divided into 4 to 8 ranges, although more may be used as in the example above. Four accumulation registers provide measurements from which the MMT processor 50 can accurately derive at least the chip edges in the direct path signal. Using the measurements from additional registers, the MMT processor may also accurately derive the chip edges of one or more multipath signals. If 4 accumulation registers are used, a first accumulation register is arranged to accumulate measurements from samples taken before the leading edge of the chip; a second accumulation register is arranged to accumulate measurements from samples taken from the start of the leading edge of a chip to a point mid-way along the edge; a third accumulation register is arranged to accumulate measurements taken from the mid-way point to the top of the leading edge of the chip; and a fourth accumulation register is arranged to take measurements from the top of the leading edge to the start of the range associated with the first accumulation register. As an example, the fourth accumulation register may collect measurements associated with samples taken along the chip to the falling edge. Three accumulation registers may ultimately be used, with the bounds for the range that covers the leading chip edge selected to provide sufficient information to the MMT processor 50.

The receiver collects pre-correlation measurements in the complex accumulation registers 32. The measurements are pre-correlation in the sense that the system does not drive the sample clock to take samples at pre-determined times relative to the estimated code chip boundaries. The system thus does not incorporate associated correlation errors into the measurements.

Once the MMT processor 50 estimates the locations of the chip edge in the direct path signal, the MMT processor 50 may adjust the ranges by, for example, shifting the starting points of and/or narrowing the ranges that include the estimated location of the chip edge and, as appropriate, widening the other ranges. Alternatively, or in addition, the MMT processor may reduce the number of ranges, such that the measurements associated with the mid-chip locations are included in fewer ranges, and so forth. To do this, the MMT processor controls the operations of the n-bit decoder, such that the decoder produces signals that enable the appropriate registers. When, for example, ranges associated with the chip edges are shifted or narrowed, the MMT processor 50 on line 51 communicates changes in the code phase offset values that are associated with the signals that the decoder produces to enable respective accumulation registers 32. The MMT processor 50 may vary the length, number and/or starting positions of the ranges by appropriately changing the code offset values associated with the respective accumulators.

The MMT processor may also compare the measured pulse shape with a reference chip transition shape, to determine if the received transmission includes other interference that may distort the calculated range. This is particularly important in safety-of-life applications, such as aircraft landings. The interference that can be detected in this manner is a type that affects the correlation operations of various receivers differently, and is otherwise hard to detect. Examples are satellite errors (including satellite component failures), microwave interference from nearby radio sources, receiver radio failures (including component failures), and so forth. Using the accurate pulse shape information provided by the complex accumulators 32, the MMT processor 50 is able to determine when such interference is present. The receiver may then ignore the received signals that include the interference or, as appropriate, correct for the distortion in the ranging calculations.

The complex accumulation registers 32 may be selectively grouped and their contents combined to provide signals that correspond to the accumulated early, punctual and late correlation values produced by the Early, Punctual and Late accumulators 28. Alternatively, or in addition, the complex accumulation registers 32 can be grouped to produce correlation values that correspond to the values produced by multiple early and multiple late correlators. The MMT processor 50 can thus operate as if using the multiple early and late correlators, without requiring any additional correlator hardware. Further, the receiver can change the groupings to narrow the effective correlator spacings.

The signals produced by the MMT processor 50 may instead be used directly to control the phase generator 22 and the CNCO 42. The MMT processor thus provides to these components as feedback signals the calculated direct path code time offset and phase angle, and the Early, Punctual and Late accumulators, PLL and DLL may be eliminated from the signal tracking operations. Thus, switches (not shown) may be added to the circuitry such that in one position the MMT processor corrects for multipath errors in the associated code and phase error signals produced by the phase error generator 82 and the code error generator 54. When the switches are in second positions, the signals produced by the MMT processor 50 are used directly to control the phase generator 22 and the CNCO 42.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention, including substituting the values produced by the MMT processor 50 for the Early, Punctual and Late accumulators, such that the DLL and PLL are eliminated, along with associated Punctual and Late versions of the local code. Further, the received signal may be sampled to produce simultaneous I and Q samples, and the mixer is then a complex mixer. The simultaneous samples are then processed in parallel, since each I and Q pair will always occur in the code chip range.

What is claimed is:

1. A correlation subsystem for a receiver that receives spread-spectrum signals, including:
   an array of complex accumulation registers that over multiple code chips accumulate correlation measurements that correspond to samples of the received signal taken at times that are asynchronous to code rate, the complex accumulators being associated with code chip ranges that span all or a portion of a code chip;
   a code phase decoder that controls the complex accumulation registers to direct respective correlation measurements to the complex accumulation registers that are associated with the code chip ranges from which the samples are taken, the code phase decoder decoding values that correspond to estimated code phase angles of the samples; and
   a processor for selectively combining the accumulated values from two or more accumulation registers to produce correlation values for use in one or more correlation techniques, multipath mitigation techniques or both.

2. The correlation subsystem of claim 1, wherein the code chip ranges over which the accumulated values are combined are selected to produce one set or multiple sets of early and late correlation values.

3. The correlation subsystem of claim 2, wherein the code chip ranges are adjustable to provide one or more desired delay spacings.

4. The correlation subsystem of claim 2 wherein one or all of the sizes, numbers and starting points of the code chip ranges are selectively varied to provide one or more desired delay spacings.

5. The correlation subsystem of claim 2 wherein the processor further manipulates the correlation values to produce early minus late code tracking discriminator information.

6. The correlation subsystem of claim 4 wherein the number of code chip ranges selected for combining is changed to narrow one or more of the delay spacings.

7. The correlation subsystem of claim 1 wherein the array further includes an accumulation register that is selectively enabled to accumulate correlation measurements associated with a code chip when the code does not transition at a chip time.

8. A receiver for receiving spread-spectrum signals, the receiver including:
   a local code generator that produces a version of a code that is included in the received signal;
   a code phase generator that produces chip edge signals and phase angles that correspond to an estimated code phase;
   a carrier phase generator that produces phase angles that correspond to an estimated carrier phase;
   a code tracking delay lock loop that produces code error signals that are used to control the code rate of the code generator;
   a carrier tracking phase lock loop that produces phase error signals that are used to control the carrier phase generator;
   a correlation subsystem that includes
      an array of complex accumulation registers that collect measurements that correspond to samples of the received signal taken at times that are asynchronous to code rate, the accumulators being associated with code chip ranges that span all or a portion of a code chip;
      a code phase decoder that controls the complex accumulators to direct the measurements to the respective complex accumulators that are associated with the code chip ranges from which the associated samples are taken, the code phase decoder decoding values that correspond to the estimated phase angles of the samples; and
      a processor that selectively combines the accumulated values from two or more accumulation registers to produce code tracking discriminator information for the code tracking delay lock loop.

9. The receiver of claim 8 wherein the processor further selectively combines the accumulated values from various code chip ranges and manipulates the results to produce phase error information for use in the carrier tracking phase lock loop.

10. The receiver of claim 8 further including
    a multipath mitigation sub-system for producing multipath mitigation information for use in code tracking, carrier tracking, or both, and
    the processor selectively combines the accumulated values from two or more accumulation registers to produce correlation values for the multipath mitigation subsystem.

11. A computer generated method for tracking a spread spectrum signal the method including the steps of:
    accumulating correlation measurements that are associated with samples of a received signal taken at times that are asynchronous to code rate over multiple code chips to produce complex accumulated values that correspond to code chip ranges that are associated with code phase angles and each span a portion of a code chip;
    selectively combining the complex accumulated values associated with two or more code chip ranges by a processor to produce correlation values for use in one or more correlation techniques, one or more multipath mitigation techniques, or both.

12. The method of claim 11 further including in the step of selectively combining the complex accumulated values the step of selecting the complex accumulated values that combine to produce one or more early correlation values and one or more late correlation values associated with one or more desired delay spacings.

13. The method of claim 12 further including in the step of producing early and late correlation values the step of combining the early and late correlation values to produce early minus late discriminator information.

14. The method of claim 13 further including in the step of selectively combining the complex accumulated values the step of selectively varying numbers of ranges that are combined, sizes of the ranges that are combined, or both.

15. The method of claim 14 wherein the number of code chip ranges selected for combining is changed to narrow one or more of the delay spacings.

16. The method of claim 11 further including in the step of selectively combining the complex accumulated values the step of selecting the complex accumulated values that combine to produce correlation values that are used to produce code tracking discriminator information.

17. The method of claim 11 wherein the step of accumulating includes the step of separately accumulating correlation measurements that correspond to sequential I and Q samples.

18. The method of claim 11 wherein
the step of accumulating includes the step of separately accumulating correlation measurements that correspond to code chips in which no transition occurred at the corresponding chip times to produce a non-transition complex accumulation value, and
the step of selectively combining includes a step of selectively including in a combination the non-transition complex accumulation value.

* * * * *

UNITED STATES PATENT AND TRADEMARK OFFICE
CERTIFICATE OF CORRECTION

PATENT NO.      : 8,442,097 B2                               Page 1 of 1
APPLICATION NO. : 12/769260
DATED           : May 14, 2013
INVENTOR(S)     : Patrick C. Fenton et al.

It is certified that error appears in the above-identified patent and that said Letters Patent is hereby corrected as shown below:

In the Specification

In col. 6, line 65 should read:
includes Inphase and Quadrature phase registers ~~321~~ 32I and Signed and Sealed this
Second Day of July, 2013

Teresa Stanek Rea
*Acting Director of the United States Patent and Trademark Office*